G. AUGHINBAUGH.
Ore Separator.
No. 63,981.  Patented Apr. 23, 1867.
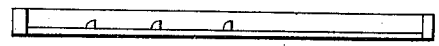
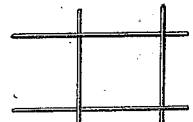
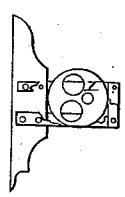
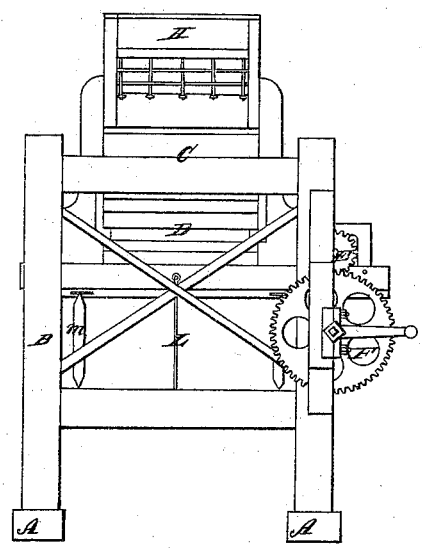
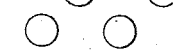
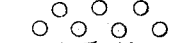
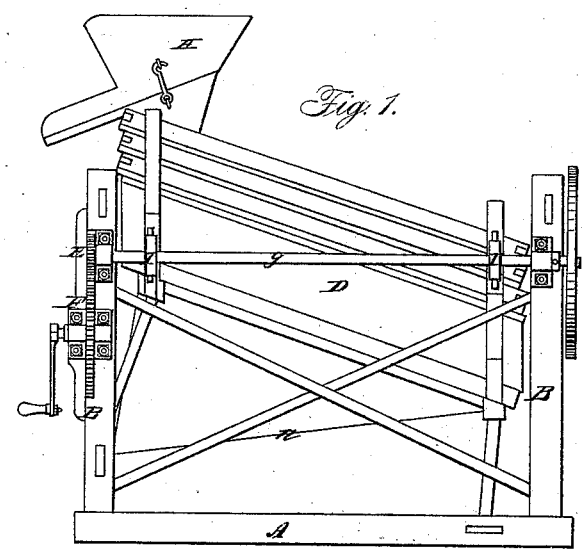
Witnesses:  Inventor:

United States Patent Office.

GIDEON AUGHINBAUGH, OF PORTLAND, OREGON.

Letters Patent No. 63,981, dated April 23, 1867; antedated April 19, 1867.

IMPROVED GOLD SEPARATOR.

The Schedule referred to in these Letters Patent and making part of the same.

TO ALL WHOM IT MAY CONCERN:

Be it known that I, GIDEON AUGHINBAUGH, of Portland, in the county of Multnomah, and State of Oregon, have invented a new and useful Machine for Separating Gold from Earth, and is intended to supply the use of water, where water cannot be obtained, requiring a sufficient quantity of water only to clean up with; it may also be advantageously used with an abundance of water; and I do hereby declare that the following is a full, clear, and exact description of the construction and operation of the same, reference being had to the annexed drawings, making a part of this specification, in which—

Figure 1 represents the side view.

Figure 2, the upper end view; and

Figure 3 represents the eccentrics, as shown by letter I in fig. 1.

Figure 4 shows the size of the mesh of the hopper screen.

Figures 5, 6, 7, 8, 9, and 10, show openings; and

Figure 11 shows the inside of one of the sieve rails which the ends of the bars butt against.

Letter A shows the sills; letter B, the posts; letter C, the ties; D, the shaker and sieves; E, the pinion; F, the wheel, to which the power is attached; G, the shaft; H, the hopper; I, the eccentric; L, the rod; M, the pivot, and N, another rod under the sills, running lengthwise, to prevent the sieves from pitching forward. By turning the crank which is attached to the shaft G the shaft G revolves, which, by means of the two eccentrics I, the shaker D, containing the sieves is moved to and fro, touching each side alternately. The earth, when worked in a dry state and broken, is thrown into hopper H, where the large gravel is thrown off; the remainder passes down into the sieves, which, by their motion, the smaller particles pass through the sieves to the fan at the bottom, which discharges what earth it receives at the lower end. The particles too coarse for each sieve pass over and are discharged at the lower ends, while the gold by its weight is lodged against the bars of the sieves. The gold which escapes through the first sieve is caught by another, or one which is too fine to allow it to escape through. The finest particles of gold which escape through all the sieves are lodged by the bars in the said pan. For the purpose of cleaning up the pan, a bottom is slid out from the upper end of the shaker, and the sieves, which are two inches above each other, can each be lifted off from the top. It may be moved by any motive power in use.

What I claim as my invention, and desire to secure by Letters Patent, is—

The principle of constructing a series of sieves, provided with bars or ripples, and placing the sieves in an inclined shaker, for the purpose of separating gold from earth, and the principle of operating said shaker upon pivots, and the direct application of eccentrics to the shaker.

GIDEON AUGHINBAUGH.

Witnesses:
 FRED. A. CRAWFORD,
 GEO. VENABLE SMITH.